United States Patent
Potnis et al.

(10) Patent No.: US 11,068,502 B1
(45) Date of Patent: Jul. 20, 2021

(54) SOFTWARE DEFINED NETWORK ATTACHED STORAGE BACKUP USING STORAGE ARRAY SYNCHRONOUS OR ASYNCHRONOUS DATA REPLICATION

(71) Applicant: EMC IP HOLDING COMPANY LLC, Hopkinton, MA (US)

(72) Inventors: Ajay Potnis, Pune (IN); Adnan Sahin, Needham, MA (US); Michael Specht, Boxborough, MA (US); Bharadwaj Sathavalli, Bangalore (IN); Shampavman Chenjeri Gururajarao, Bangalore (IN); Maneesh Singhal, Bangalore (IN)

(73) Assignee: EMC IP Holding Company LLC, Hopkinton, MA (US)

( * ) Notice: Subject to any disclaimer, the term of this patent is extended or adjusted under 35 U.S.C. 154(b) by 533 days.

(21) Appl. No.: 16/176,060

(22) Filed: Oct. 31, 2018

(51) Int. Cl.
*G06F 16/30* (2019.01)
*G06F 16/27* (2019.01)
*G06F 3/06* (2006.01)

(52) U.S. Cl.
CPC ............ *G06F 16/273* (2019.01); *G06F 3/065* (2013.01); *G06F 3/067* (2013.01); *G06F 3/0619* (2013.01); *G06F 16/275* (2019.01)

(58) Field of Classification Search
CPC ...... G06F 16/275; G06F 3/065; G06F 16/273; G06F 3/0619; G06F 3/067
See application file for complete search history.

(56) References Cited

U.S. PATENT DOCUMENTS

| | | | | |
|---|---|---|---|---|
| 8,443,163 B1* | 5/2013 | Bailey | ............ | G06F 3/064 711/170 |
| 8,959,388 B1* | 2/2015 | Kuang | ............ | G06F 11/0793 714/6.2 |
| 9,330,105 B1* | 5/2016 | Duprey | ............ | G06F 16/1744 |
| 9,612,756 B1* | 4/2017 | Koli | ............ | G06F 3/0689 |
| 9,934,172 B1* | 4/2018 | Koli | ............ | G06F 13/102 |
| 2018/0095851 A1* | 4/2018 | Zhang | ............ | G06F 11/2069 |

OTHER PUBLICATIONS

Article entitled "eNAS Support Matric for VMAX3", by EMC, dated Dec. 2016. (Year: 2016).*
Article entitled "Configuring NDMP Backups with Celerra and BakBone NetVault", by EMC, dated Aug. 2004. (Year: 2004).*

* cited by examiner

*Primary Examiner* — Mahesh H Dwivedi
(74) *Attorney, Agent, or Firm* — Anderson Gorecki LLP

(57) ABSTRACT

Software Defined Network Attached Storage data backup is implemented using storage array synchronous data replication. A TLU is created for each user filesystem managed by a Virtual Data Mover (VDM). A VDM configuration filesystem is also created containing metadata describing a mapping of user file system TLU to physical storage resources on the storage array. Both the user filesystem TLUs and the VDM configuration filesystem are mapped to an asynchronous Remote Data Forwarding (RDF) group of the storage array, which is used by the storage array to replicate both the user filesystem TLUs and VDM configuration filesystem. Filesystem ID and export path information are reserved on the primary storage array and backup storage array when the RDF group is set up, to enable transparent failover from the primary to the backup node of selected VDMs.

19 Claims, 9 Drawing Sheets

US 11,068,502 B1

SOFTWARE DEFINED NETWORK ATTACHED STORAGE BACKUP USING STORAGE ARRAY SYNCHRONOUS OR ASYNCHRONOUS DATA REPLICATION

BACKGROUND

This disclosure relates to computing systems and related devices and methods, and, more particularly, to a Software Defined Network Attached Storage (SDNAS) data backup using storage array asynchronous data replication.

SUMMARY

The following Summary and the Abstract set forth at the end of this application are provided herein to introduce some concepts discussed in the Detailed Description below. The Summary and Abstract sections are not comprehensive and are not intended to delineate the scope of protectable subject matter which is set forth by the claims presented below.

All examples and features mentioned below can be combined in any technically possible way.

Software Defined Network Attached Storage data backup is implemented using storage array asynchronous data replication. A TLU is created for each user filesystem managed by a Virtual Data Mover (VDM). A VDM configuration filesystem is also created containing metadata describing a mapping of user file system TLU to physical storage resources on the storage array. Both the user filesystem TLUs and the VDM configuration filesystem are mapped to an asynchronous Remote Data Forwarding (RDF) group of the storage array, which is used by the storage array to replicate both the user filesystem TLUs and VDM configuration filesystem. Filesystem ID and export path information are reserved on the primary storage array and backup storage array when the RDF group is set up, to enable transparent failover from the primary to the backup node of selected VDMs.

DETAILED DESCRIPTION

This disclosure is based, at least in part, on the realization that it would be advantageous to enable Software Defined Network Attached Storage (SDNAS) data backup using synchronous data replication facilities of the underlying storage arrays.

Figure 1:
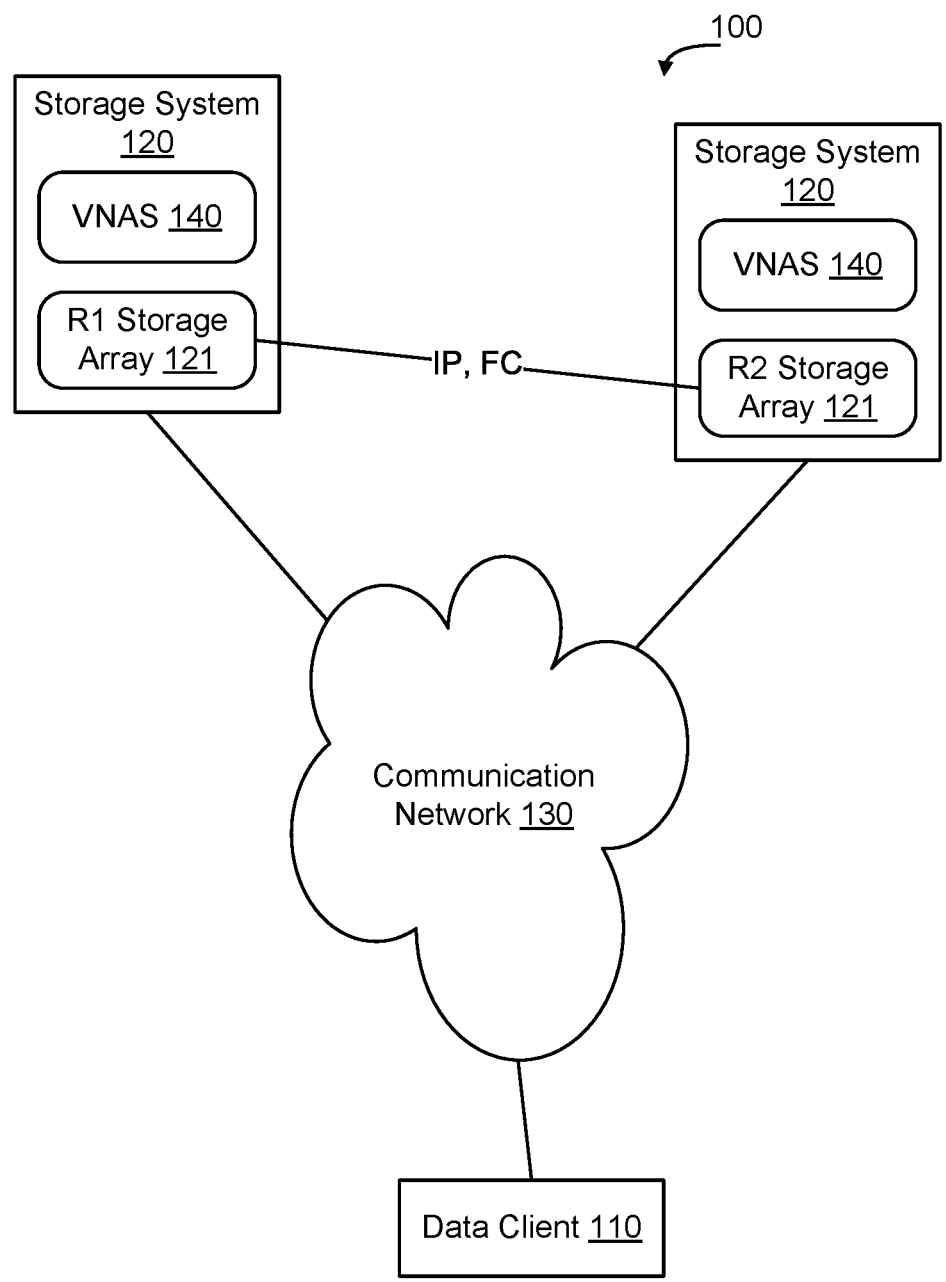
FIG. 1 is a functional block diagram of an example storage environment including software defined network attached storage systems which use synchronous data replication facilities of the underlying storage arrays for data backup, according to some embodiments of the present disclosure

FIG. 1 is a functional block diagram of an example storage environment 100. As shown in FIG. 1, in storage environment 100, a data client 110 may access storage resources provided by one or more storage systems 120 over a communication network 130. In some embodiments, the communication network 130 is an Internet Protocol (IP) communication network 130 enabling transmission of IP data packets through the communication network 130, although other forms of communication networks may be used to interconnect the data client 110 with storage systems 120 depending on the implementation.

Data from the data client 110 is stored in the storage resources of the storage systems 120. Storage resources that are accessed by a data client 110 over a communication network 130 are referred to herein as Network Attached Storage (NAS). In some embodiments, each storage system 120 has a storage array 121 of physical storage resources, which are abstracted to the data client 110 by software applications running on the storage systems 120 referred to herein as "Software Defined Network Attached Storage (SDNAS) applications." A given SDNAS application may, in some embodiments, be implemented as a Virtual Network Attached Storage (VNAS) server 140.

To provide enhanced reliability, data from data client 110 may be stored in a storage system 120 and backed up on a second storage system 120 on the communication network 130. In some embodiments, the data client 110 interacts with a filesystem maintained by a primary VNAS server 140 on a primary storage system 120. If a failure occurs on the primary storage system 120, on communication network 130, or elsewhere, which renders the data client 110 unable to access the filesystem on the primary storage system 120, the data client 110 is able to access the filesystem on the backup VNAS server 140 on the backup storage system 120.

Two or more VNAS servers 140 that are logically associated to provide redundant access to one or more filesystems will be referred to herein as a "cluster". In some embodiments, a cluster may include multiple VNAS servers 140, and each VNAS server 140 may be responsible for hundreds of filesystems. A VNAS server 140 will also be referred to herein as a "node" in a storage cluster. As used herein, the term "data Virtual Data Mover (VDM)" will be used to refer to software that is responsible for managing access to and replication of one or more filesystems on a VNAS server 140. A given node in a storage cluster may have multiple SDNAS processes executing thereon, and each SDNAS process may have multiple data VDMs executing within it.

In some embodiments, the underlying storage arrays 121 of the storage systems 120 that are implementing a storage cluster coordinate to exchange data such that both the primary storage array R1 and backup storage array R2 have a copy of the client data.

Figure 2:
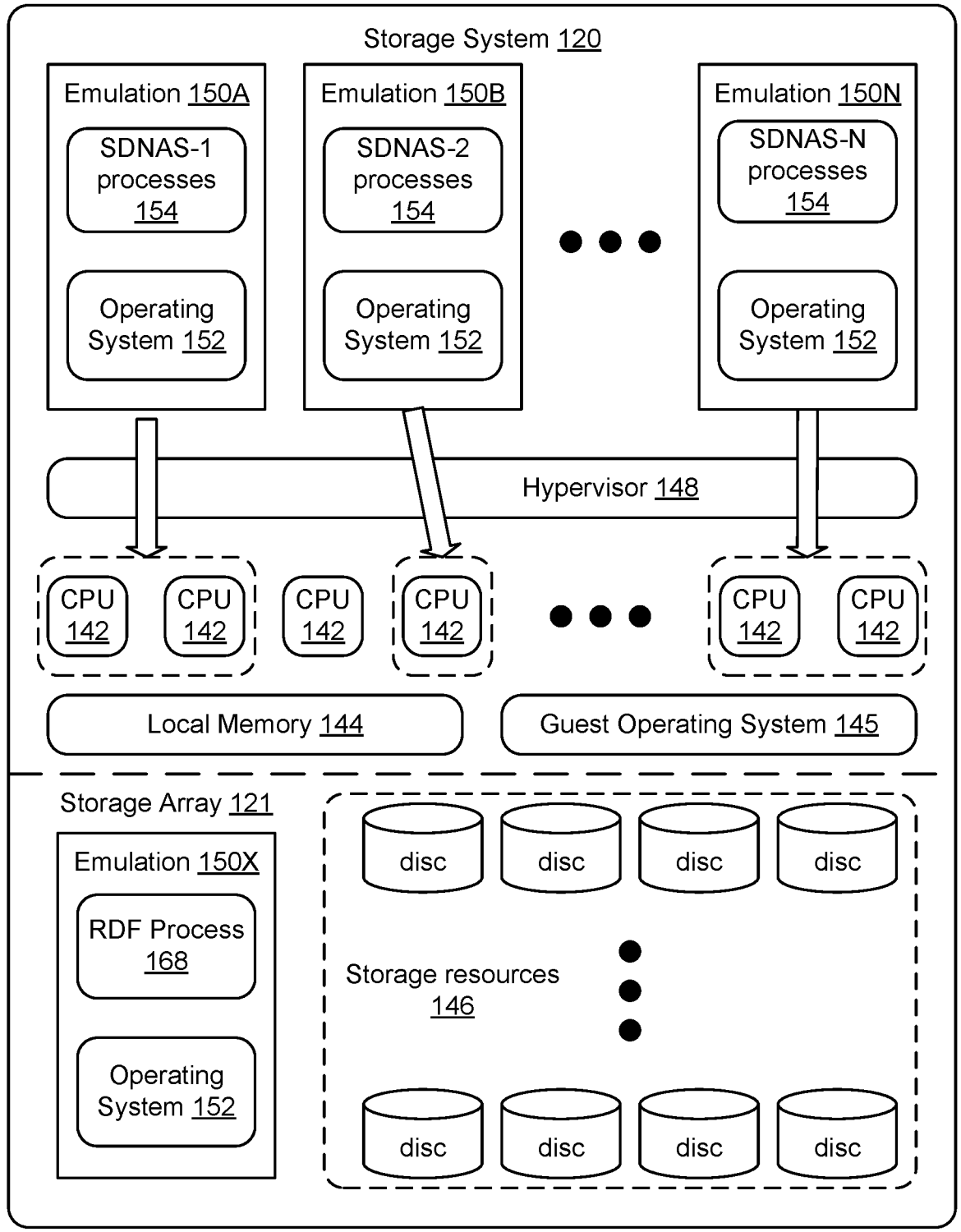
FIG. 2 is a functional block diagram of an example storage system for use in the storage environment of FIG. 1, according to some embodiments of the present disclosure.

FIG. 2 is a functional block diagram of an example storage system 120 for use in the storage environment 100 of FIG. 1. As shown in FIG. 2, the storage system 120 has physical resources including a number of CPU processor cores 142, local memory 144, a storage array 121 including storage resources 146, and other physical resources. A hypervisor 148 abstracts the physical resources of the storage system 120 from emulations 150, and allocates physical resources of storage system 120 for use by the emulations 150.

Each emulation 150 has an operating system 152 and one or more application processes running in the context of the operating system. As shown in FIG. 2, in some embodiments, one or more of the emulations 150 instantiated on storage system 120 implements one or more Virtual Network Attached Storage (VNAS) software applications 154 to enable the emulation to implement a VNAS server 140 on the communication network 130.

Figure 3:
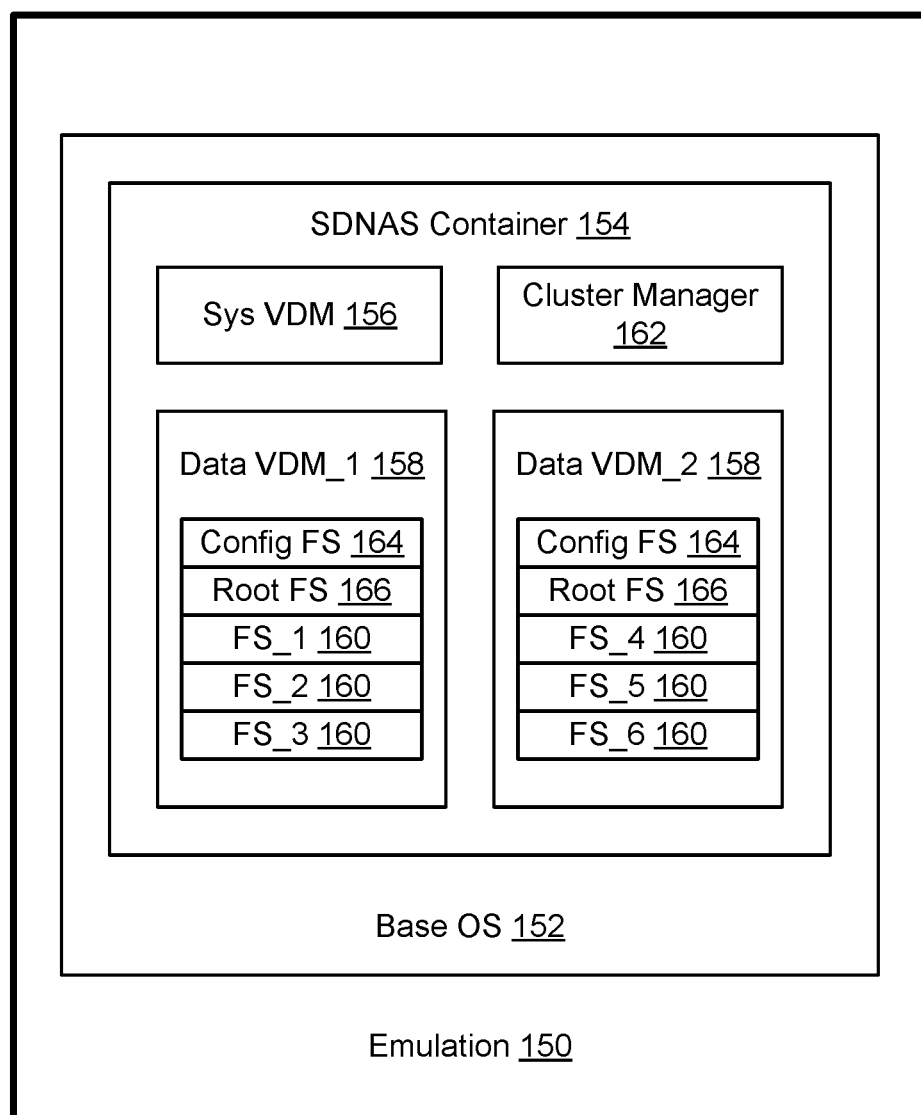
FIG. 3 is a functional block diagram of an example emulation implementing a Software Defined Networked Attached Storage (SDNAS) process of the storage system of FIG. 2, according to some embodiments of the present disclosure.

An example SDNAS application 154 is shown in greater detail in FIG. 3. As shown in FIG. 3, each SDNAS application 154 has a system Virtual Data Mover 156 and one or more data VDMs 158. Different data VDMs 158 may be associated with different data clients 110, and each data VDM 158 is responsible for one or more user filesystems 160. Each VDM 158 has a VDM root filesystem 166 and a VDM configuration filesystem 164. The VDM configuration filesystem 164 includes a SDNAS database describing how the data of the VDM root filesystem 166 and user filesystems 160 is stored in underlying storage resources 146 of the storage array 121.

A given storage system 120 may have emulations functioning as nodes in multiple storage clusters. One of the SDNAS processes in each storage cluster executes a cluster manager 162 that controls the overall structure of the storage cluster, such as defining which nodes are included in the storage cluster, which nodes and which SDNAS processes 154 executing on those nodes are to host particular data VDMs 158, which nodes should be backup nodes for particular data VDMs 158, and which user filesystems 160 should be handled by each data VDM 158.

In the example shown in FIG. 3, SDNAS container 154 includes system VDM 156. The SDNAS container 154 also includes two data VDMs 158, which are responsible for sets of user filesystems 160. For example, in the example shown in FIG. 3 data VDM-1 is responsible for user filesystems 1-3 and data VDM-2 is responsible for user filesystems 4-6.

Referring again to FIG. 2, one or more of the emulations 150 may execute applications configured to control operation of the storage array 121. For example, one application that may be executing in an emulation 150X on storage system 120 is a Remote Data Forwarding (RDF) application process 168, which causes subsets of data stored within storage resources 146 of storage array 121 to be mirrored by the storage array 121 to one or more similar backup storage arrays 121.

It is possible for a primary storage array 121 (R1) to perform data replication to a backup storage array 121 (R2) where the storage systems 120 are compatible and properly configured. The RDF application 168, when executed on storage system 120, enables the storage array 121 to participate in storage system level data replication between sets of mirroring pairs of storage systems 120. A set of storage arrays 121 that are configured for data to be mirrored from a primary storage array 121 (R1) to a backup storage array 121 (R2) will be referred to herein as a "Remote Data Facility". A given storage system, such as storage system 120, may operate as a primary storage array R1 or backup storage array R2 in many mirroring pairs, and hence multiple RDF applications 168 may simultaneously execute on storage system 120 to control participation of the storage array 121 in the mirroring operations.

Data transfer among storage systems, including transfers between storage arrays 121 for data replication (mirroring) functions, may take place in several ways depending on how the primary storage system handles data written by the data client 110 and how the backup storage system acknowledges receipt of data on the remote data facility. Two example data mirroring modes will be referred to herein as synchronous (SYNC) and asynchronous (ASYNC). Where data transfers occur between storage arrays 121, data transfer can be either over Fibre Channel or over an IP network between the two storage arrays 121. The channel used to transfer data between the storage arrays 121 (R1, R2) may not be shared by other components like the VNAS or client.

In a synchronous data replication mode, data is transmitted from the primary storage array R1 to the backup storage array R2 as the data is received from the data client 110, and an acknowledgement of a successful write is transmitted by the backup storage array R2 synchronously with the completion thereof. To maintain a synchronous relationship between the primary storage array R1 and the backup storage array R2, each IO from the data client 110 is forwarded by the primary storage array R1 to the backup storage array R2 as it is received from data client 110, and the primary storage array R1 will wait for an acknowledgment from the backup storage array R2 before issuing a subsequent IO from the data client 110.

In an asynchronous data replication mode, when data is received from the data client 110, the data is written to the primary storage array R1 and a data transfer process is initiated to write the data to the backup storage array R2 on the remote data facility. The primary storage array R1 acknowledges the write operation to the data client 110 before the primary storage array R1 has received an acknowledgement that the data has been received by the backup storage array R2. The use of asynchronous data replication enables the data on the primary storage array R1 and backup storage array R2 to be one or more cycles out of synchronization, because the primary storage array R1 will continue to execute IOs prior to receipt of acknowledgments from the backup storage array R2. The use of asynchronous replication may be beneficial in connection with sites located geographically distant from each other, for example where the distance between the primary storage array R1 and the backup storage array R2 is such that waiting for an acknowledgement from the backup storage array R2 would take considerable time and, hence, reduce responsiveness of the primary storage array R1 to the data client 110.

In some embodiments, the storage system 120 presents storage volumes as Thin Logical Units (TLU) 170. A TLU is a logical construct which enables the physical storage resources 146 of the storage system to be abstracted from the SDNAS applications 154. A logical unit is "thin", as that term is used herein, when actual physical resources 146 are only allocated to the TLU as needed. For example, a TLU may be presented to the SDNAS application 154 as having an available size of 1 TB (Tera-Byte). However, if the filesystem stored in the TLU is only 0.5 TB in size, the storage system will only allocate 0.5 TB of physical storage resources 146 to the TLU. Thus, the amount of physical storage resources 146 allocated to a TLU will increase and decrease over time as the amount of data stored on the TLU changes over time. Within the physical storage resources, Data Devices (TDATs) are used to store the data, in which a given TDAT may be formed of a redundant group of physical disk drives, i.e. a TDAT may be formed from a RAID group of disk drives that store blocks of data within the storage array 121.

TLUs are allocated physical storage resources 146 based on intended service level objectives for the data contained in the filesystem maintained by the TLU. Different storage resources 146 may have different IO characteristics, and storage groups 410 are created from storage resource pools of storage resources 146 to enable the storage group to meet the intended service level objective. As noted above, a given VDM may manage multiple user filesystems 160. The different user filesystems 160 may have different service level objectives and, accordingly, the user filesystem TLUs 170 may be located in different storage groups 410.

In some embodiments, the VDM root filesystem 166 is stored in a first TLU referred to herein as a root filesystem TLU, and VDM configuration filesystem 164 is stored in a second TLU referred to herein as a configuration filesystem TLU 174.

Data associated with data clients 110 is stored in user filesystem 160. A given data VDM 158 may handle multiple user filesystems 160 which may be associated with the same data client 110 or may be associated with different data clients 110. Each user filesystem 160 is stored in a separate TLU referred to herein as a user filesystem TLU 170. Metadata describing the mapping of the user filesystem TLU 170 to physical storage resources 146 is contained in the VDM configuration filesystem 164.

Synchronous RDF Replication

Figure 4:
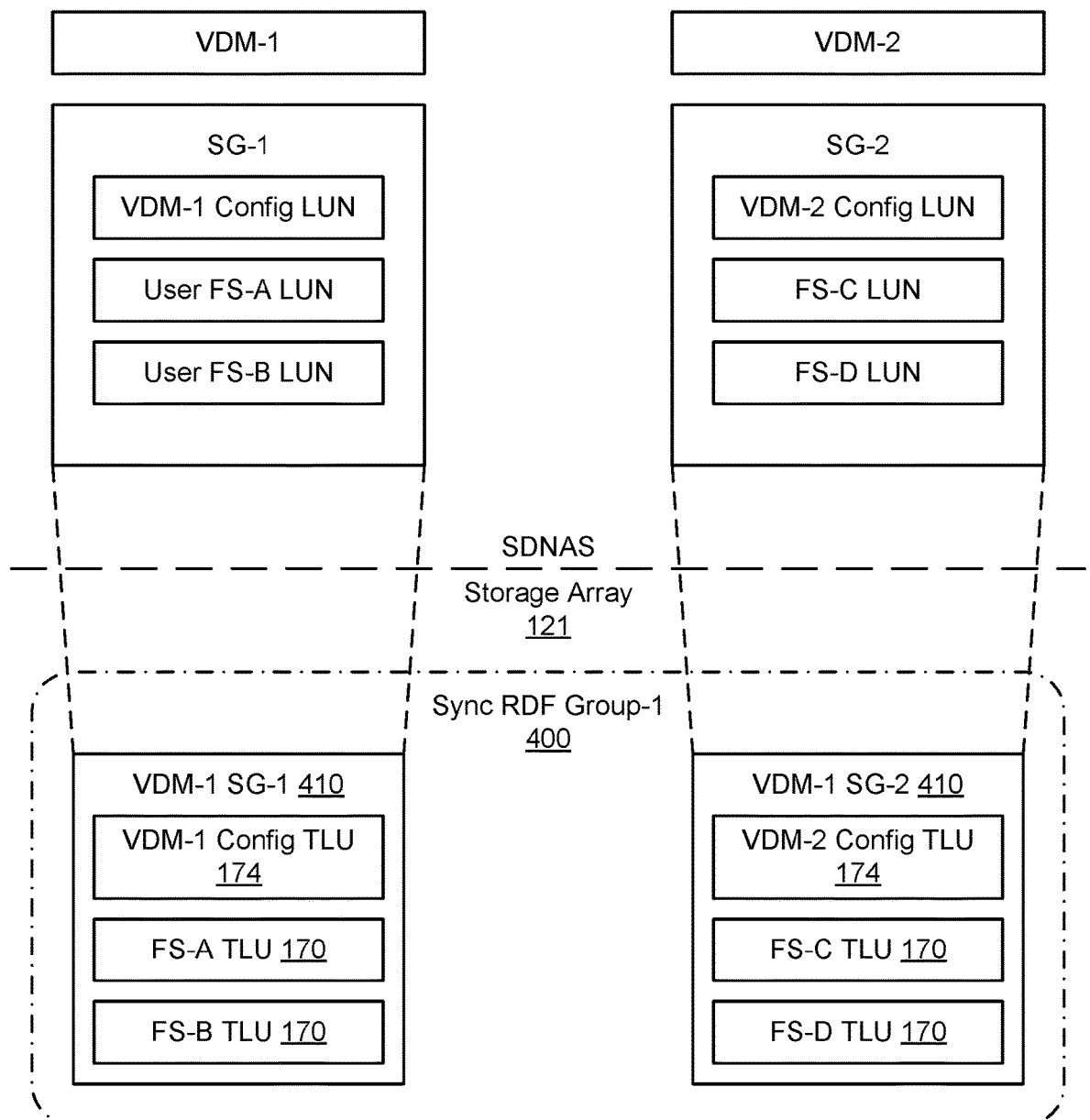
FIG. 4 is a functional block diagram of a basic architecture of software defined network attached storage systems using synchronous data replication facilities of the underlying storage arrays for data backup, according to some embodiments of the present disclosure.
Figure 5:
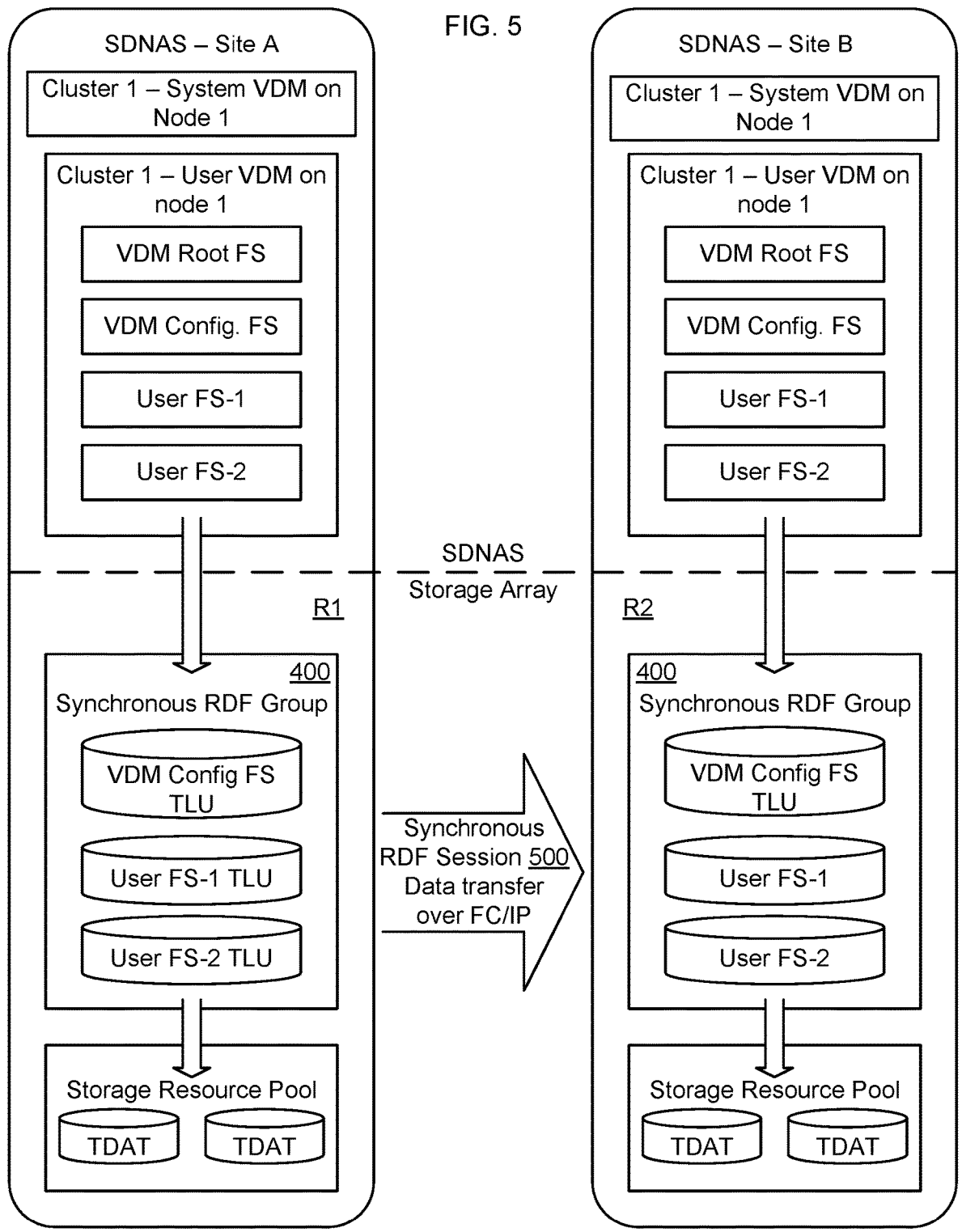
FIG. 5 is a functional block diagram of two software defined network attached storage systems using synchronous data replication facilities of the underlying storage arrays for data backup, according to some embodiments of the present disclosure.

FIG. 4 shows an example architecture for selection of data to be replicated on a synchronous RDF session 500 (see FIG. 5). In some embodiments, a synchronous RDF session 500 involves data transfer from the primary storage array R1 to the backup storage array R2 over a Fiber Channel or IP connection between the storage arrays 121. In some embodiments, the synchronous RDF session 500 replicates all data contained within a given RDF group 400, and only one RDF group 400 will be replicated on any given RDF session 500. Thus, there is a one-to-one matching between RDF group 400 on a storage array 121 (R1), and a synchronous RDF session 500 that is used to mirror data contained in the RDF group 400 to the backup storage array 121 (R2).

Each RDF group 400 may include multiple storage groups 410, each of which may include multiple TLUs 170. TLUs 170 may be added by VDMs to a storage group 410 that is part of a RDF group 400 to cause the TLUs 170 to be replicated on the synchronous RDF session 500.

FIG. 4 shows an example in which two VDMs are implemented on a given SDNAS server. Data for both VDMs is stored in storage array 121. As shown in FIG. 1, VDM-1 has storage group SG-1 that includes VDM-1 ConFIG. LUN, user filesystem A LUN, and user filesystem B LUN. The LUNs of VDM-1 are stored by Thin Logical Units (TLUs) offered by the underlying storage array 121 and are included in a first storage group VDM-1 SG-1 410. Likewise, VDM-2 has storage group SG-2 that includes VDM-2 ConFIG. LUN, user filesystem C LUN, and user filesystem D LUN. The LUNs of VDM-2 are stored by TLUs offered by the underlying storage array 121 and are included in a second storage group VDM-2 SG-2 410.

Storage Group VDM-1 SG-1 410 and storage group VDM-2 SG-2 410 are both included in a first synchronous Remote Data Forwarding (RDF) Group-1 400, which will be replicated to a backup storage array 121 (R2) in the cluster on a synchronous RDF session 500. FIG. 5 shows an example in which a synchronous RDF session 500 is used to replicate data of a SDNAS process 154 from a primary storage array R1 to a backup storage array R2.

In some embodiments the data VDM 158 configuration filesystem 164 maintains metadata relevant to accessing the user filesystem 160 contents, such as the user ID map and network configuration. When the data VDMs configuration filesystem 164 and user filesystems 160 are combined together and are replicated to the backup storage array 121 on a single synchronous RDF session 500, it becomes possible to failover the data VDM 158 to the backup site more easily and enable quicker access to data post failover. In some embodiments, by ensuring that the primary and backup sites have the same identifier (private key such as Filesystem ID and export path or share names) reserved for use at time of configuring replicating service (when setting up the synchronous RDF session on the primary storage array R1 and backup storage array R2), it is possible to ensure no disruption on the IO path access as there is no change in identifier post failover from the primary site to the backup site or vice versa. This also provides additional benefits to applications like an antivirus scanner, which are configured to scan specific paths on the primary site as well as on the backup site post failover due to disaster recovery or load balancing.

Figure 6:
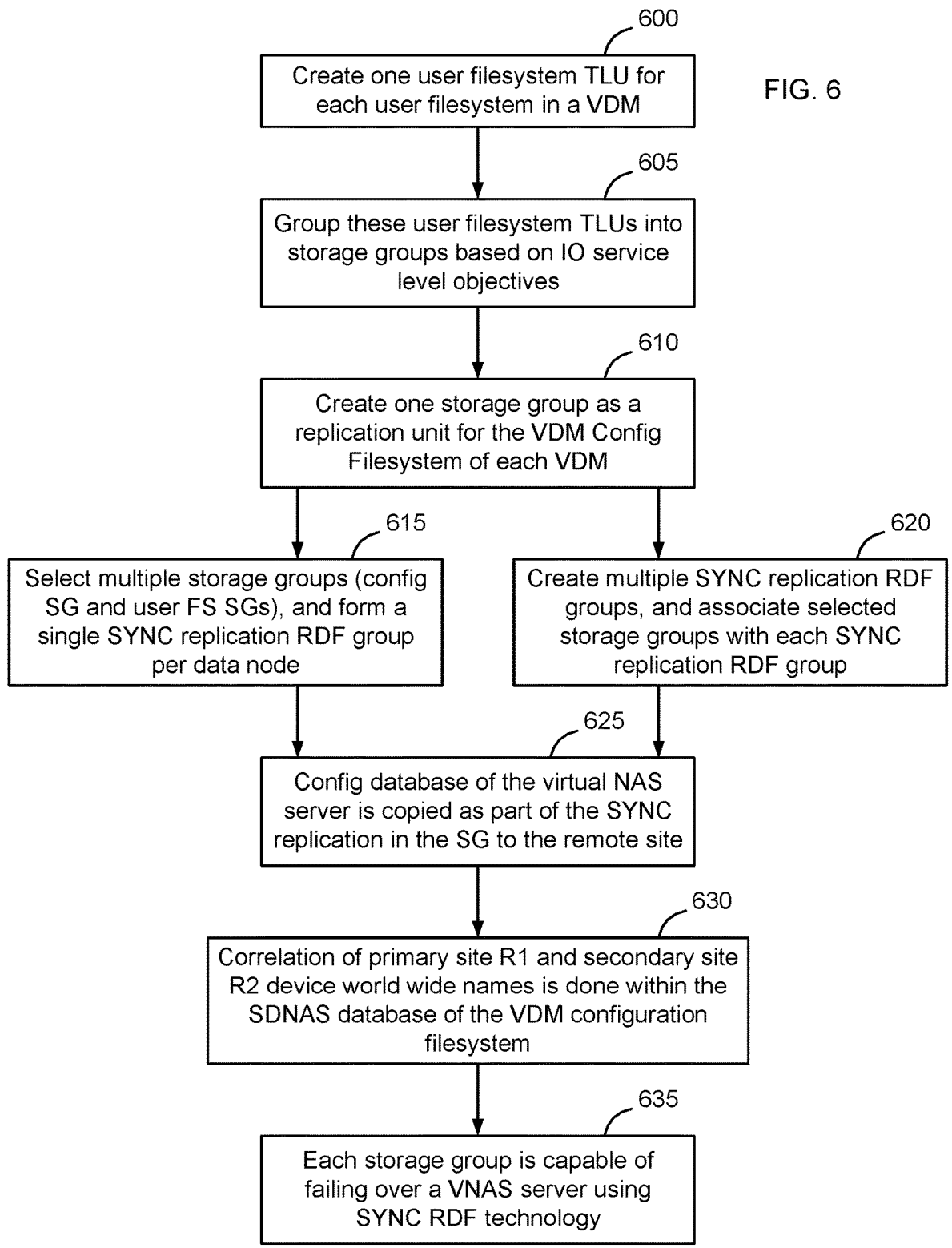
FIG. 6 is a flow chart showing an example method of software defined network attached storage systems using synchronous data replication facilities of the underlying storage arrays for data backup, according to some embodiments of the present disclosure.

FIG. 6 is a flow chart showing an example method of software defined network attached storage systems using synchronous data replication facilities of the underlying storage arrays for data backup, according to some embodiments of the present disclosure. As shown in FIG. 6, in some embodiments a TLU 170 is created for each user filesystem 160 in a data VDM 158 (block 600). The TLUs are put into storage groups based on desired service level objectives for IO processing on the TLUs (block 605). A storage group is also created as a replication unit for the VDM config filesystem TLU 174 in block 610.

Multiple storage groups are then selected and used to form a single synchronous RDF group 400 per data node (block 615). The collection of TLUs of the selected groups that are included in the synchronous RDF group 400 are part of the disaster recovery solution for the data VDM 158. Alternatively, as shown in block 620, it is possible for multiple synchronous RDF groups 400 to be used to replicate individual storage groups or sets of storage groups for the VDM. Accordingly, in some embodiments one or more than one synchronous RDF group will be created to replicate storage groups holding filesystems of the VDM. Using multiple RDF groups may be advantageous in particular scenarios. For example, it may be desirable to group filesystems with similar IO patterns into a given storage group, and then use a separate synchronous RDF group 400 and separate synchronous RDF session 500 to replicate data of the synchronous RDF group from the primary storage array R1 to the backup storage array R2.

A synchronous RDF session 500 starts replicating all TLUs of the RDF group 400 to enable all TLUs contained in the storage groups that are part of the RDF group 400 to be replicated from the primary storage array 121 (R1) to the backup storage array 121 (R2). Since the VDM config filesystem TLU 174 is included in the RDF group along with the user filesystem TLUs 170, the same synchronous RDF replication session 500 is used to transfer the VDM config filesystem 164 as well as the user filesystems 160 (block 625). By including VDM config filesystem 164, the backup storage array is guaranteed to have the required mount metadata for the replicated filesystems. On the backup, the replicated filesystem mount information is filtered and linked to the device information on the backup, to enable selected or all filesystems of a virtual NAS server (VDM) to be replicated. In some embodiments, the correlation of primary site R1 and backup site R2 world-wide names is done within the SDNAS database of the VDM configuration filesystem (block 630). Accordingly, each storage group is capable of failing over a virtual NAS server individually using synchronous RDF technology of the underlying storage arrays 121 (block 635).

Asynchronous RDF Replication

Figure 7:
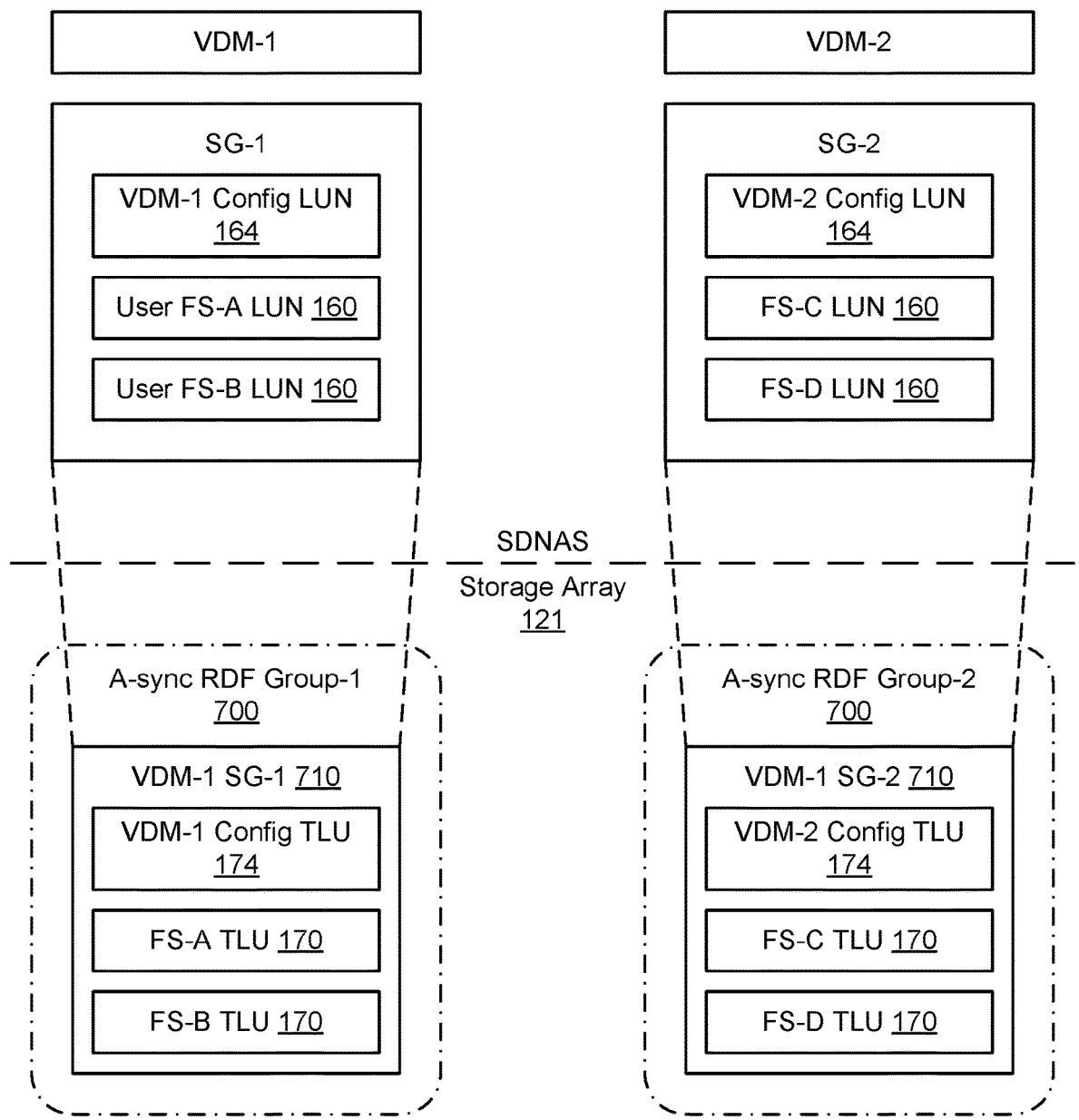
FIG. 7 is a functional block diagram of a basic architecture of software defined network attached storage systems using asynchronous data replication facilities of the underlying storage arrays for data backup, according to some embodiments of the present disclosure.
Figure 8:
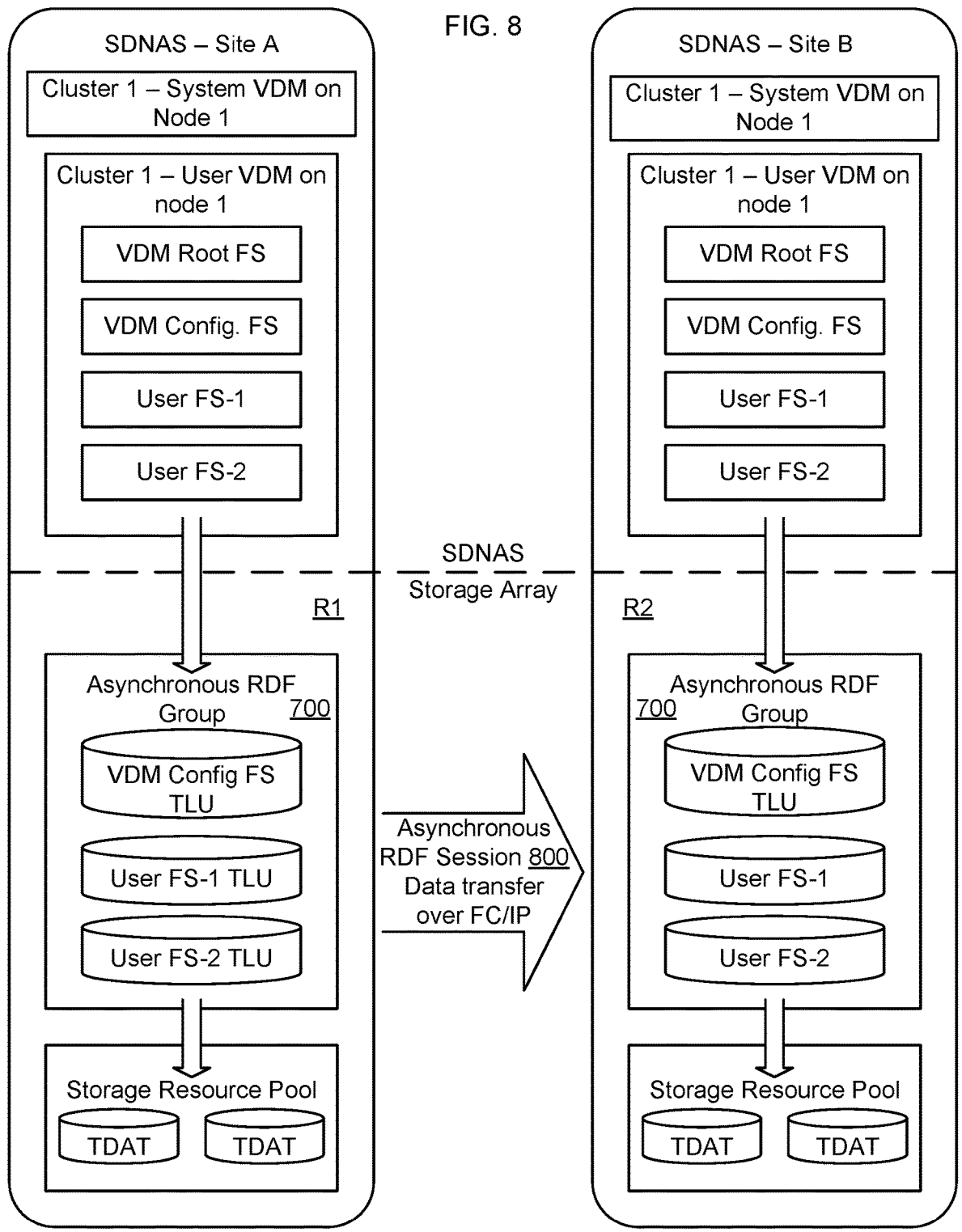
FIG. 8 is a functional block diagram of two software defined network attached storage systems using asynchronous data replication facilities of the underlying storage arrays for data backup, according to some embodiments of the present disclosure.

FIG. 7 shows an example architecture for selection of data to be replicated on an asynchronous RDF session 800 (see FIG. 8). In some embodiments, an asynchronous RDF session 800 involves data transfer from the primary storage array R1 to the backup storage array R2 over a Fiber Channel or IP connection between the storage arrays 121. In some embodiments, the asynchronous RDF session 800 replicates all data contained within a given RDF group 700, and only one RDF group 700 will be replicated on any given asynchronous RDF session 800. Thus, there is a one-to-one matching between an asynchronous RDF group 700 on a primary storage array 121 (R1), and an asynchronous RDF session 800 that is used to mirror data contained in the RDF group to the backup storage array 121 (R2).

With asynchronous RDF, the primary storage array R1 and backup storage array R2 are not synchronized. Specifically, as noted above, transactions are acknowledged by the primary storage array R1 to the data client 110 before the changed data has been provided to the backup storage array R2. Accordingly, the backup storage array R2 may be one or more cycles behind the primary storage array R1. If a given asynchronous RDF group has more than one storage group, during failover it is necessary to failover all storage groups associated with the asynchronous RDF group 700. For example, if there are two VDMs on the primary site, and the TLUs for the two VDMs are part of storage groups that are assigned to the same asynchronous RDF group 700, during failover both VDMs will need to be shut down on the primary site and brought back up on the backup site. The asynchronous nature of the RDF data transfer dictates that at failover the backup site does not know which data has not been synchronized, and accordingly, all emulations with data included in the asynchronous RDF group 700 will need to be moved from the primary site to the backup site.

In some embodiments, a separate asynchronous RDF group 700 is used for each VDM instantiated on the primary site R1 to enable individual failover of VDMs when asynchronous RDF groups are used to replicate data between storage systems. Each VDM creates one or more storage groups for its config filesystems and data filesystems, and only the storage groups being used by the VDM are included in a separate asynchronous RDF group for that VDM. The one-to-one correspondence between VDM and asynchronous RDF group enables individualized failover of the VDM from the primary site R1 to the backup site R2 during VDM movement or VDM failover. While this necessitates the use of a large number of asynchronous RDF groups, in some embodiments having the ability to individually fail over an individual VDM may be beneficial. In other instances, it may be unlikely that it would be desirable to failover VDMs individually, and in those instances sets of VDMs may be assigned to share asynchronous RDF groups.

In some embodiments, each VDM has config filesystem 164 and a plurality of data filesystems 160. The data filesystems 160 can be individually associated with individual storage groups or multiple data filesystems can be associated with the same storage group depending on the implementation. Accordingly, one or more data filesystems is associated with one or more storage groups 710.

Depending on how the storage groups are to be handled, from a data replication standpoint, one or more storage groups 710 are then associated with an asynchronous RDF group 700. In some embodiments, all storage groups of a given VDM are associated with one asynchronous RDF group 700. In some embodiments individual storage groups 710 of a given VDM are associated with respective individual asynchronous RDF groups 700. In some embodiments, sets of storage groups associated with a given VDM are associated with respective individual asynchronous RDF groups. During failover, all storage groups associated with a given asynchronous RDF group will need to be moved from the primary site to the backup site. Accordingly, the number of storage groups associated with a given asynchronous RDF group will affect the number of filesystems that need to be moved during failover. For example, if a storage group contains a single data filesystem, and that storage group is the only storage group in an asynchronous RDF group, it is possible to move that data filesystem by itself from the primary site to the backup site. By contrast, if all data filesystems of a given VDM are associated with storage groups that collectively are included in the same asynchronous RDF group, the entire VDM and all its data filesystems will need to be moved as a group should failover to the backup site occur.

If it becomes necessary to move a VDM from a primary node to a backup node, for example to proactively use failover to move responsibility for a given VDM, in some embodiments a new temporary asynchronous RDF group is created for the VDM that is to move and the storage groups for the given VDM are moved to the new temporary asynchronous RDF group. The new temporary asynchronous RDF group is then used for a period of time to perform data replication for the given VDM that is to be moved. After a period of time, the given VDM can be failed over from the primary node to the backup node without affecting any of the VDMs in the original asynchronous RDF group. In this way it is possible to individually failover VDMs using asynchronous RDF replication, at least when it is known beforehand that failover of one or more of the VDMs will be necessary/desirable.

In some embodiments, the primary and backup sites have the same identifier such as filesystem ID and export path reserved when asynchronous RDF replication is configured. This makes failover more transparent to the data client 110 because all the naming conventions and paths that the data client 110 uses to access the data are the same on both systems.

Each asynchronous RDF group 700 may include multiple storage groups 710, each of which may include multiple TLUs 170. TLUs 170 may be added by VDMs to a storage group 710 that is part of a RDF group 700 to cause the TLUs 170 to be replicated on the asynchronous RDF session 800.

FIG. 7 shows an example in which two VDMs are implemented on a given SDNAS server. Data for both VDMs is stored in storage array 121. As shown in FIG. 7, VDM-1 has storage group SG-1 that includes VDM-1 ConFIG. LUN, user filesystem A LUN, and user filesystem B LUN. The LUNs of VDM-1 are stored by Thin Logical Units (TLUs) 170 offered by the underlying storage array 121 and are included in a first storage group VDM-1 SG-1 710. Likewise, VDM-2 has storage group SG-2 that includes VDM-2 ConFIG. LUN, user filesystem C LUN, and user filesystem D LUN. The LUNs of VDM-2 are stored by TLUs offered by the underlying storage array 121 and are included in a second storage group VDM-2 SG-2 710.

Storage Group VDM-1 SG-1 710 and storage group VDM-2 SG-2 710 are included in different asynchronous Remote Data Forwarding (RDF) groups, which will be individually replicated on separate remote data facilities to either the same backup storage array 121 (R2) in the cluster or optionally to different backup storage arrays 121 in the storage cluster on asynchronous RDF sessions 800. FIG. 8 shows an example in which an asynchronous RDF session 800 is used to replicate data of a SDNAS process 154 from a primary storage array R1 to a backup storage array R2.

In some embodiments the data VDM 158 configuration filesystem 164 maintains metadata relevant to accessing the user filesystem 160 contents, such as the user ID map and network configuration. When the data VDMs configuration filesystem 164 and user filesystems 160 are combined together and are replicated to the backup storage array 121 on a single asynchronous RDF session 800, it becomes possible to failover the data VDM 158 to the backup site more easily and to enable quicker access to data post failover. In some embodiments, by ensuring that the primary site and backup site have the same identifier (private key such as Filesystem ID and export path or share names) reserved for use at the time the asynchronous remote data facility is configured (when setting up the asynchronous RDF session on the primary and backup storage arrays 121), it is possible to ensure no disruption on the IO path access as there is no change in identifier post failover from the primary site to the backup site or vice versa. This also provides additional benefits to applications like an antivirus scanner, which are configured to scan specific paths on the primary site as well as backup site post failover due to disaster recovery or load balancing.

Figure 9:
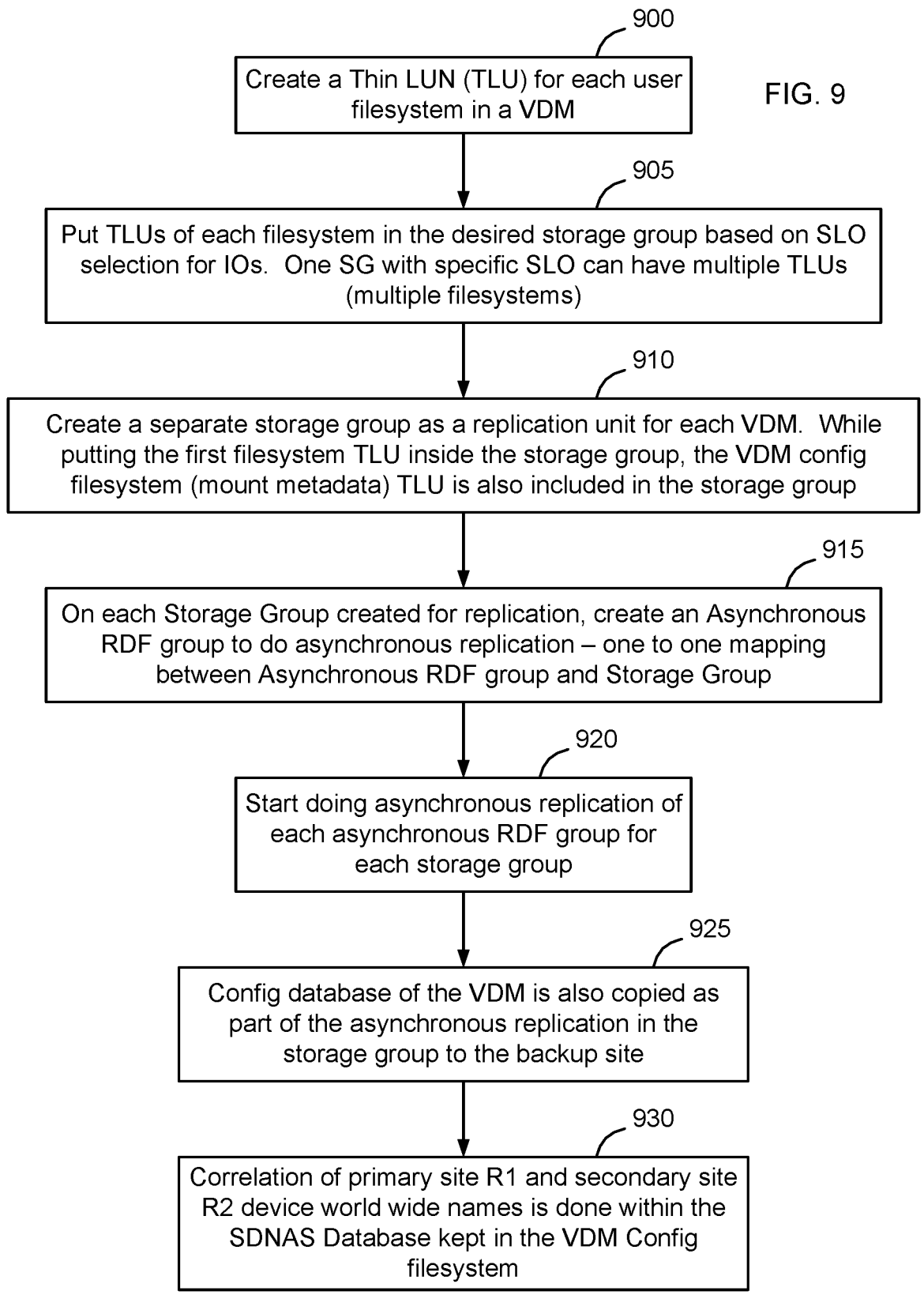
FIG. 9 is a flow chart showing an example method of software defined network attached storage systems using asynchronous data replication facilities of the underlying storage arrays for data backup, according to some embodiments of the present disclosure.

FIG. 9 is a flow chart showing an example method of software defined network attached storage systems using asynchronous data replication facilities of the underlying storage arrays for data backup, according to some embodiments of the present disclosure. As shown in FIG. 9, in some embodiments a Thin LUN (TLU) 176 is created for each user filesystem 160 in a data VDM 158 (block 900). The TLUs are put into storage groups based on desired Service Level Objectives (SLO) for IO processing on the TLUs (block 905). One storage group with a specific service level objective can have multiple TLUs (multiple filesystems).

A storage group is also created as a replication unit for the VDM config filesystem TLU in block 910. While putting the first filesystem TLU inside a storage group, the VDM config filesystem containing the mount metadata for that first filesystem TLU is also included in the storage group.

An asynchronous RDF group is created to be used to perform asynchronous RDF replication on a remote data facility and one or more storage groups are added to the asynchronous RDF group (block 915). The collection of TLUs of the selected groups that are included in the RDF group 400 are part of the disaster recovery solution for the data VDM 158. It is possible for multiple RDF groups 400 to be used to replicate individual storage groups or sets of storage groups for the VDM. In some embodiments, on each storage group created for replication, an asynchronous RDF group is created to perform asynchronous replication of the data contained in the storage group. This one-to-one mapping between asynchronous RDF group and storage group in some embodiments provide additional flexibility as to which filesystems must be moved during a failover/movement event. Accordingly, in some embodiments one or more than one RDF group will be created to replicate storage groups holding filesystems of the VDM. Using multiple RDF groups may be advantageous in particular scenarios. For example, it may be desirable to group filesystems with similar IO patterns into a given storage group, and then use a separate RDF group 400 and separate asynchronous RDF session 500 to replicate data of the RDF group from the primary storage array R1 to the backup storage array R2.

Once the asynchronous RDF groups are created, the storage array 121 will start asynchronous replication of the data of each storage group in each asynchronous RDF replication group (Block 920). The VDM configuration filesystem (database) is also copied as part of the asynchronous replication in the storage group to the backup storage array R2 (Block 925). Since the VDM config filesystem TLU is included in the RDF group along with the user filesystem TLUs, the same asynchronous RDF replication session 500 is used to transfer the VDM config filesystem 164 as well as the user filesystems 160. By including VDM config filesystem 164, the backup storage array is guaranteed to have the required mount metadata for the replicated filesystems. On the backup, the replicated filesystem mount information is filtered and linked to the device information, to enable selected or all filesystems of a virtual NAS server to be replicated.

In some embodiments, the correlation of primary site R1 and backup site R2 world-wide names is done within the SDNAS database kept in the VDM config filesystem (block 930). Accordingly, each storage group is capable of failing over a virtual NAS server individually using asynchronous RDF technology of the underlying storage arrays 121.

While the invention is described through the above example embodiments, it will be understood by those of ordinary skill in the art that modification to and variation of the illustrated embodiments may be made without departing from the inventive concepts herein disclosed. Moreover, while the embodiments are described in connection with various illustrative structures, one skilled in the art will recognize that the system may be embodied using a variety of specific structures. Accordingly, the invention should not be viewed as limited except by the scope and spirit of the appended claims.

The methods described herein may be implemented as software configured to be executed in control logic such as contained in a CPU of an electronic device such as a computer. In particular, the functions described herein may be implemented as sets of program instructions stored on a non-transitory tangible computer readable storage medium. The program instructions may be implemented utilizing programming techniques known to those of ordinary skill in the art. Program instructions may be stored in a computer readable memory within the computer or loaded onto the computer and executed on computer's microprocessor. However, it will be apparent to a skilled artisan that logic described herein can be embodied using discrete components, integrated circuitry, programmable logic used in conjunction with a programmable logic device such as a Field Programmable Gate Array (FPGA) or microprocessor, or any other device including any combination thereof. Programmable logic can be fixed temporarily or permanently in a tangible computer readable medium such as random-access memory, a computer memory, a disk, or other storage medium. All such embodiments are intended to fall within the scope of the present invention.

Throughout the entirety of the present disclosure, use of the articles "a" or "an" to modify a noun may be understood to be used for convenience and to include one, or more than one of the modified noun, unless otherwise specifically stated.

Elements, components, modules, and/or parts thereof that are described and/or otherwise portrayed through the figures to communicate with, be associated with, and/or be based on, something else, may be understood to so communicate, be associated with, and or be based on in a direct and/or indirect manner, unless otherwise stipulated herein.

Various changes and modifications of the embodiments shown in the drawings and described in the specification may be made within the spirit and scope of the present invention. Accordingly, it is intended that all matter contained in the above description and shown in the accompanying drawings be interpreted in an illustrative and not in a limiting sense. The invention is limited only as defined in the following claims and the equivalents thereto.

What is claimed is:

1. A non-transitory tangible computer readable storage medium having stored thereon a computer program for implementing Software Defined Network Attached Storage (SDNAS) data backup using storage array data replication, the computer program including a set of instructions which, when executed by a computer, cause the computer to perform a method comprising the steps of:
    creating one user filesystem Thin Logical Unit (TLU) for each user filesystem in a Virtual Data Mover (VDM), each user filesystem TLU including data for each user filesystem managed by the VDM;
    creating one VDM configuration filesystem containing metadata describing a mapping of user file system TLU to physical storage resources on the storage array;
    mapping both the user filesystem TLUs and the VDM configuration filesystem to a Remote Data Forwarding (RDF) group of the storage array; and
    replicating, by the storage array, the content of the RDF group on a remote data facility to a backup storage array.

2. The non-transitory tangible computer readable storage medium of claim 1, wherein the remote data facility uses synchronous remote data forwarding to replicate the content of the RDF replication group from the primary storage array to the backup storage array.

3. The non-transitory tangible computer readable storage medium of claim 1, wherein the remote data facility uses asynchronous remote data forwarding to replicate the content of the RDF replication group from the primary storage array to the backup storage array.

4. The non-transitory tangible computer readable storage medium of claim 1, further comprising mapping additional user filesystem TLUs and VDM configuration filesystems of second VDMs to the RDF group.

5. The non-transitory tangible computer readable storage medium of claim 4, further comprising replicating, by the storage array, the additional user filesystem TLUs and VDM configuration filesystems of the second VDMs to the backup storage array.

6. The non-transitory tangible computer readable storage medium of claim 1, further comprising mapping the user filesystem TLUs to storage groups based on intended service level objective for the user filesystems.

7. The non-transitory tangible computer readable storage medium of claim 6, wherein the step of mapping comprises mapping storage groups to the RDF group.

8. The non-transitory tangible computer readable storage medium of claim 6, further comprising determining user filesystems with similar IO activity, mapping the user filesystems with similar IO activity to a first storage group, and wherein the step of mapping the user filesystem TLUs to an RDF group comprises creating a separate RDF group for the first storage group.

9. The non-transitory tangible computer readable storage medium of claim 1, further comprising receiving, by the backup storage array, the filesystem TLUs and VDM configuration filesystem on the RDF session.

10. The non-transitory tangible computer readable storage medium of claim 9, further comprising parsing the VDM configuration filesystem and using the metadata of the VDM configuration filesystem to mount the filesystem TLUs on the second storage array.

11. The non-transitory tangible computer readable storage medium of claim 10, further comprising only selecting mount information about replicated user data filesystems.

12. The non-transitory tangible computer readable storage medium of claim 1, further comprising reserving filesystem ID and export path information on the primary storage array and backup storage array in connection with the step of the user filesystem TLUs for the user filesystems.

13. A non-transitory tangible computer readable storage medium having stored thereon a computer program for implementing Software Defined Network Attached Storage (SDNAS) data backup using a storage array remote data facility, the computer program including a set of instructions which, when executed by a computer, cause the computer to perform a method comprising the steps of:
    creating one user filesystem Thin Logical Unit (TLU) for a user filesystem in a Virtual Data Mover (VDM), the user filesystem TLU including data for the user filesystem managed by the VDM;
    creating one VDM configuration filesystem containing metadata describing a mapping of the user file system TLU to physical storage resources on the primary storage array;
    mapping both the user filesystem TLU and the VDM configuration filesystem to a storage group in the primary storage array;
    mapping the storage group to a Remote Data Forwarding (RDF) replication group; and
    replicating, by the primary storage array, the content RDF replication group on the remote data facility from the primary storage array to the backup storage array.

14. The non-transitory tangible computer readable storage medium of claim 13, wherein the remote data facility uses synchronous remote data forwarding to replicate the content of the RDF replication group from the primary storage array to the backup storage array.

15. The non-transitory tangible computer readable storage medium of claim 13, wherein the remote data facility uses asynchronous remote data forwarding to replicate the content of the RDF replication group from the primary storage array to the backup storage array.

16. The non-transitory tangible computer readable storage medium of claim 13, wherein the configuration metadata contains mount metadata to enable the backup storage array to mount the user filesystem TLU to replicate the manner in which the user filesystem is mounted on the primary storage array.

17. A storage environment, comprising:
a first storage system having a first Virtual Data Mover (VDM) process implemented thereon and a first storage array providing physical storage resources in the first storage system;
a second storage system having a second storage array providing physical storage resources in the second storage system;
a first remote data forwarding (RDF) group formed on the first storage array, the first RDF group including a storage group including data of a first filesystem being managed by the VDM and data of a first VDM configuration filesystem, the data of the first VDM configuration filesystem containing configuration metadata of the first user filesystem describing how to mount the user filesystem on the second storage array to cause the user filesystem mount on the second storage array to match a user filesystem mount on the first storage array; and
a remote data forwarding replication process instantiated in an emulation on the first storage system and configured to replicate data of the first remote data forwarding group on a remote data facility to the second storage array.

18. The storage environment of claim 17, wherein the remote data facility uses synchronous remote data forwarding to replicate the content of the RDF replication group from the primary storage array to the backup storage array.

19. The storage environment of claim 17, wherein the remote data facility uses asynchronous remote data forwarding to replicate the content of the RDF replication group from the primary storage array to the backup storage array.

* * * * *